United States Patent
Takagi et al.

(10) Patent No.: US 7,197,462 B2
(45) Date of Patent: Mar. 27, 2007

(54) SYSTEM AND METHOD FOR INFORMATION ACCESS

(75) Inventors: Hironobu Takagi, Tokyo-to (JP); Chieko Asakawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 10/133,686

(22) Filed: Apr. 27, 2002

(65) Prior Publication Data
US 2002/0198720 A1  Dec. 26, 2002

(30) Foreign Application Priority Data
Apr. 27, 2001 (JP) ............... 2001-133732

(51) Int. Cl.
*G10L 15/00* (2006.01)
(52) U.S. Cl. ............................ 704/275; 704/260
(58) Field of Classification Search ............... 704/275, 704/260; 345/728
See application file for complete search history.

(56) References Cited

U.S. PATENT DOCUMENTS

| | | | |
|---|---|---|---|
| 5,953,392 A | * | 9/1999 | Rhie et al. ............... 379/88.13 |
| 6,115,686 A | * | 9/2000 | Chung et al. ............... 704/260 |
| 6,366,650 B1 | * | 4/2002 | Rhie et al. ............... 379/88.13 |
| 6,606,611 B1 | * | 8/2003 | Khan ............... 706/10 |

* cited by examiner

*Primary Examiner*—Daniel Abebe
(74) *Attorney, Agent, or Firm*—Ference & Associates

(57) ABSTRACT

To convert the structure of a Web page into contents that a user can easily listen to, and for permitting the user to access and obtain information without have to perform and navigation, in a manner similar to listening to the radio. A designated target page is obtained from a Web server, and a linked list for the target page is analyzed to obtain a linked destination page. A transcoding module inserts the main content of the linked destination page into a linked location on the target page, and converts the page into a structure appropriate for oral reading. Then, a VoiceXML generation module converts the target page into a VoiceXML document, and a VoiceXML browser performs a speech response process for the VoiceXML document. A command is input to the VoiceXML browser orally or by using a dial key entry provided using a telephone, and a speech from the VoiceXML browser is output to the telephone.

25 Claims, 12 Drawing Sheets

Metz used IBM's WebSphere Voice Server Software Developers Kit (SDK) that incorporates VoiceXML technology to create a nutritional planning tool in which users follow simple voice prompts to learn more about nutrition and to plan their diet.

"What impressed me about Brent's program was how smoothly he integrated so many complex components," said Peter Lefkin, one of the judges who is executive director of the VoiceXML Forum. "The application had a crisp, professional feel, as well as the type of user interface that encourages users to explore all of the layers of the program."

The contest was judged by four industry experts who rated submissions based on robustness, originality, reliability, usefulness and integration with other technologies. The other judges were Stephen McClure, vice president, speech and natural language software at International Data Corp.; Dr. Alfred Z. Spector, vice president of services and software at IBM Research; and Tony Temple, IBM fellow and vice president, ease of use, IBM.

First prize winner was Wei Wang, a graduate student at Leeds Metropolitan University. He won a trip for two to a final championship sports game for creating an astrology application utilizing original sounds and voice prompts. Users answer voice prompts to hear about their Chinese, Eastern or Western sign and other personalized information and useful advice on their Zodiac sign.

The "Cool Blue VoiceXML Challenge" was introduced in December 2000 for students at universities, colleges and technical schools in the United States, Canada, Australia, the United Kingdom and Ireland. Student developers were challenged to create applications that used IBM's VoiceXML-based browser. The Web-based contest was designed to begin cultivating the skills base of the future community of software developers and promote the use of VoiceXML.

→ Masters golf coverage includes streaming Web video Masters golf coverage includes streaming Web video Golf fans may sense they can smell the freshly mowed grass as they join the gallery on the first tee via live streaming video on the official Web site of the 2001 Masters Tournament at Augusta National Golf Club.

IBM is assisting tournament officials in producing and hosting the site at http://www.masters.org for the sixth consecutive year.

The tournament is scheduled April 2-8.

Visitors to the site will be able to witness real-time the traditional honorary starters ceremony featuring Byron Nelson and Sam Snead at about 8:15 a.m. (EDT), Thursday, April 5. On Sunday evening, April 8, fans will be able to enjoy the live presentation of the winner's green jacket, then conclude their streaming video experience with an interview with the tournament winner.

In addition to the Masters leader board -- which contains information ranging from real-time results and current leaders to eagle summaries and best rounds -- the site will showcase several new features, including:

- Wireless access -- Fans who have Internet-enabled mobile phones and hand-held devices that support the Wireless Application Protocol and subscribe to WAP services, can access the Masters leader board, groupings and tee times, and the latest news by logging on to the site's WAP address, http://wap.masters.org
- Internet radio -- Listen to tournament radio coverage beginning Monday, April 2, through Sunday, April 8.
- Expanded remote camera coverage -- Check out more still shots, via multiple Webcams placed throughout the golf

Fig. 9 course, for personalized views of Augusta National.

→ Pfizer, Microsoft, IBM to collaborate on physician software

Pfizer will collaborate with Microsoft and IBM to form an independent company that will develop software and services for physicians.

Focus of the company will be to reduce administrative workload for physicians, allowing them more time to provide patient care. The new company is expected to make its first products available later this year.

The new company will focus on the needs of office-based physicians, particularly those in smaller groups, which represent 70 percent of the office-based doctors in the United States.

Using Microsoft's .NET Enterprise Server Platform, Windows 2000 and wireless devices, product offerings will emphasize integrated clinical, financial and administrative tools to help physicians streamline workflow.

Physicians and other care providers will have access to complete medical histories, insurance information, lab results, billing arrangements and more while treating the patients. At the same time, providers will be able to rapidly document patient findings using high quality encoding security systems to ensure that all information is securely transmitted and patient confidentiality fully respected.

"We at IBM share Pfizer's focus on customers and emphasis on developing solutions that directly address customer needs," said Russell J. Ricci, M.D., general manager IBM Global Healthcare. "We are committed to providing services to the new company to help integrate and deploy technologies, as well as Web-hosting operations and help desk services through our call centers."

→ More news and newsletters

Fig. 10

| Basic | | |
|---|---|---|
| 1 Previous link | 2 Click link | 3 Next link |
| 4 Previous line | 5 Current line | 6 Next line |
| 7 Previous group | 8 Current group | 9 Next group |
| * [modifier] | 0 Current position | # [terminate] |

| With modifier(*) | | |
|---|---|---|
| 1 | 2 | 3 |
| 4 Top of group | 5 Current group | 6 |
| 7 Top of page | 8 Current proup | 9 Bottom of page |
| * [modifier] | 0 Current position | # [terminate] |

Fig. 11

- Rule
  "[Jump to]" = "Skip to"
- General Commands
  "Click here" = "Jump here"
  "[Jump to] main content"
  ▶ Jump to annotated or detected starting point of main content.
  "Exit now"
- Line
  "[Jump to] previous line"
  "Current line"
  "[Jump to] next line" = "Skip [this] line"
  "Back 5 lines"
  "Skip 5 lines"
  "Where am I ?" = "[Explain] current position"
  "[Explain] detailed position"
- Group
  "[Jump to] first link in [this] group"
  "[Jump to] last link in [this] group"
  "[Jump to] top of [this] group"
  "[Explain] current group"
  "[Jump to] bottom of [this] group"
  "[Jump to] previous group"
  "[Jump to] next group"
- Page
  "[Jump to] top of [this] page"
  "[Jump to] bottom of [this] page"

Fig. 12

SYSTEM AND METHOD FOR INFORMATION ACCESS

CLAIM FOR PRIORITY

This application claims priority from Japanese Patent Application No. 2001-133732, filed on Apr. 27, 2001, and which is hereby incorporated by reference as if fully set forth herein.

FIELD OF THE INVENTION

The present invention relates to a method and a system for outputting web content and to a program therefor, and in particular to an effective technique for an application to be used for the incidental acquisition of information (content) available on a web page, an activity that is similar to listening to the radio.

BACKGROUND OF THE INVENTION

Quite frequently, people listen to the radio or to music while working, using their eyes and hands. People, for example, tend to listen to the radio or to music while driving, while traveling by train (particularly, packed trains), or while performing housekeeping chores, such as cooking, cleaning and washing.

Further, since with the increase in the popularity of the Internet, web and e-mail browsing have become rather generalized pursuits, there are times when people desire to access web pages or to check their e-mail but are constrained from doing so by work or other activities that restrict their use of computer screens and keyboards. However, even though their eyes and hands are occupied, these people may still be able to use their ears, and to employ a method whereby speech synthesis browsers or oral reproduction software are used to read aloud from Web pages, from e-mail messages or from other text matter, and thereby enable information to be accessed simply by listening. As an example method of this sort, the news article download software "NewsTool" includes functions that can obtain a list of articles carried by individual news company sites, and can then continuously download and read the contents of the articles aloud.

It should be noted that with VoiceXML, a standardized, structured speech processing language based on XML (short for Extensible Markup Language), the speech process can be easily performed and an automatic speech input/output system can be constructed that uses a telephone, for example.

When information content, such as an e-mail, is composed mainly of text data, the data can be quite satisfactorily accessed using a speech synthesis browser or oral reproduction software. However, when a Web page is to be read, a variety of speech synthesization problems are encountered.

Web pages are generally written using a structural language, such as HTML (short for HyperText Markup Language) or XML, and the content has a complicated structure for which elements and frames are used. Further, a Web page includes a wide content assortment, including image data, which are inappropriate for oral reading, and generally only a small amount of text data is included with the elements. Also, titles and text content are more widely separated in accordance with correlations established using links. Since the design of a web page is such that the contents of individual elements are sorted in detail using a complicated structure and are presented visually, merely by orally reading such a web page using a conventional speech browser, it is difficult to provide an adequate amount of information that would permit a person to understand the content, if the person is listening inattentively. In addition, navigation based on the elements and the structure used is required to reproduce information so it is coherent and correlated. However, in most cases, while people are working their hands are occupied, and the performance of complex navigational operations using keywords is not appropriate for workers who are not listening closely. Furthermore, when frames are used to divide pages, errors occurs when frames are switched. Even when NewsTools is employed, the smooth oral reading of articles is possible only for specific sites; a critical limitation of the application is that formatting for targeted sites, pages and articles must be incorporated in advance, and the setup can not be changed spontaneously.

It is said that with the advent of widespread Internet use, a digital divide that has long existed for users unfamiliar with computer operations, and for the physically impaired and for elderly people who tend to know little about information technology has been increased. The resolving of this problem is considered to be a very important social objective. Thus, if an information service can be provided that can be accessed merely by using a telephone, a device that almost everybody can easily employ, it is expected that the restraints imposed by the digital divide will be removed. At this time, the use of the Web is still preferable when the volume and the topicality of information are taken into consideration. However, problems encountered at the time a structured document is read orally appear when a telephone is used to access the Web to obtain information, and a technique must be provided that permits of the numerical keys of a telephone to be used for navigation. If these problems can be resolved, it is anticipated that the information service provided by the current telephone response system, which handles only a small amount of information and updates that information less frequently, can be dramatically expanded.

SUMMARY OF THE INVENTION

The present invention broadly contemplates converting the structures of web pages into content that provides easy listening for users, and that permits users, just as when they are listening to the radio, to access and obtain information without having to provide special navigational guidance. The present invention also contemplates the use of an apparatus, such as a telephone response system, that everyone can easily operate and use to access information carried on web pages.

An overview of the invention will now be given. According to the invention, an information access method comprises the steps of: designating a link or a linked list in a web page; obtaining a linked destination page designated in the link or in the linked list; inserting all or a part of the content of the linked destination page into a linked location at the web page; and outputting speech for all or a part of the content of the linked destination page inserted into the linked location at the web page. One part of the linked destination page that is inserted into the linked location at the web page is the main content of the linked destination page; and in accordance with the information access method, since the content of the linked destination page is inserted into the linked location at the target web page, the collected data (information) is conjoined to produce a single page, so that a user can obtain satisfactory information in the manner as when listening casually to a radio.

The main content of the linked destination page can be extracted using a first method for referring to annotation information or using a second method for extracting a difference from a page that is similar to the linked destination page. As a result, a web page can be obtained for which the structure is appropriate for oral reading.

The process for the insertion of the linked destination page is recorded as the annotation information, and by referring to the annotation information the following process is automatically performed.

The information access method further comprises a step of: converting, into a VoiceXML document, the web page into which part or all of the linked destination page has been inserted. System construction can be facilitated by using the VoiceXML, and flexible speech recognition/input can be effected. Further, for the conversion into the VoiceXML document, each element of a web page can be allocated to the VoiceXML form, and can be read orally in consonance with prompts included in the form. In addition, when the processing for the form is performed in order while the time-out for the form is set to 0, the elements (e.g., text information) corresponding to the form can be read orally sequentially.

When the same grammars for a key input operation and a speech operation are set for the form, and an interrupt is permitted, a command can be accepted during the processing performed for the form. Therefore, a user can input speech or a key without being aware of the delimiters between the forms.

The destination for the output of a speech is a telephone, and through the telephone, a command can be input using speech or a dial tone. Since a telephone that anyone can easily operate is employed, it is anticipated that use of the speech response system of the invention can be extended.

For speech output, sound effects can be added that reflect the structure, the volume, and the current processing location of the Web page content, and other associated information. Thus, an overview of the page can be easily obtained from the speech output.

In addition, along with the speech a corresponding display image can be prepared, and by outputting the display to a device having a small screen, usability can be improved.

According to the information access method, the invention further comprises the steps of: detecting the main frame for the web page; generating a link correlated with a frame other than the main frame; and adding the link to the main frame. Thus, a frame can be developed for a page including a main frame, and can be converted into an appropriate form for speech output.

The main frame can be detected as a first element, a frame that is to be displayed in the largest area, a second element, a frame in which the greatest number of characters are included, or a third element, a frame having the greatest index that is used to weight the first and the second elements, or a combination of the elements. When annotation is added to the main frame, the information access method further comprises the step of: rearranging groups in the main frame, in accordance with the annotation, and inserting text or a link into the main frame or performing another operation.

The information access method of the invention can be implemented as a system or as a program.

Another aspect of the present invention is an information access system comprising: a designator for designating a link or a linked list in a web page; an obtainer for obtaining a linked destination page designated in said link or in said linked list; an inserter for inserting all or a part of the content of said linked destination page into a linked location at said web page; and an outputter for outputting speech for all or a part of said content of said linked destination page inserted into said linked location at said web page.

Furthermore, the present invention provides a program storage device readable by machine, tangibly embodying a program of instructions executable by the machine to perform method steps for facilitating data clustering, said method comprising the steps of: designating a link or a linked list in a web page; obtaining a linked destination page designated in said link or in said linked list; inserting all or a part of the content of said linked destination page into a linked location at said web page; and outputting speech for all or a part of said content of said linked destination page inserted into said linked location at said web page.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 4 is a diagram showing an example display screen for a linked destination page corresponding to a linked list line 21.

FIG. 5 is a diagram showing an example display screen for a linked destination page corresponding to a linked list line 22.

FIG. 6 is a diagram showing an example display screen for a linked destination page corresponding to a linked list line 23.

FIG. 7 is a diagram showing an example display screen for a linked destination page corresponding to a linked list line 24.

FIG. 9 is a diagram showing a display screen for (part of) the page obtained by radio transcoding.

FIG. 10 is a diagram showing a display screen for (part of) the page obtained by radio transcoding.

FIG. 11 is a diagram showing an example allocation of commands for telephone keys.

FIG. 12 is a diagram showing example speech commands.

FIG. 13 is a block diagram showing an example system configuration employing a combination composed of a plug-in and streaming software.

DETAILED DESCRIPTION OF THE PREFERRED EMBODIMENTS

Figure 1:
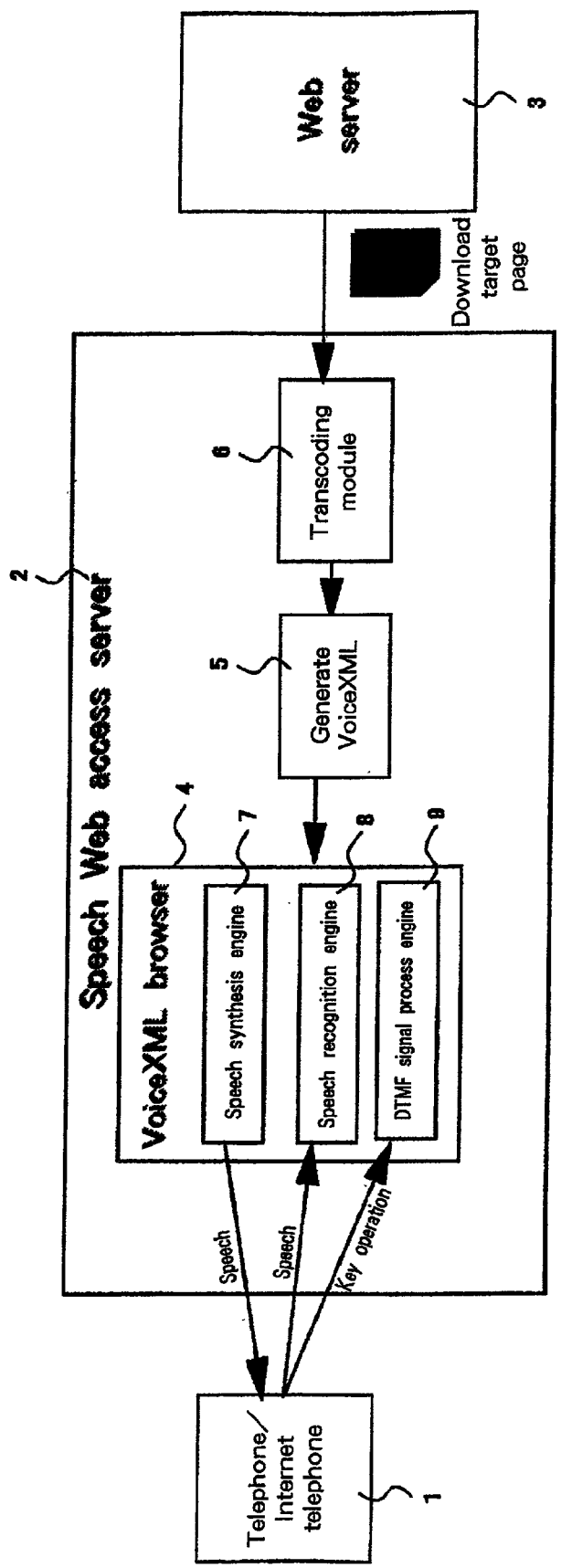
FIG. 1 is a block diagram showing an example information access system according to one embodiment of the invention.

The preferred embodiment of the invention will now be described in detail while referring to the accompanying drawings. It should be noted, however, that the invention should not be limited to the described embodiment, and that it can be applied for many other, varied embodiments. Note also that throughout the embodiment the same reference numerals are used to denote corresponding components.

In the following embodiment, mainly the method or the system will be explained, and as will be apparent to one having ordinary skill in the art, the present invention can be implemented not only as a system, but also as a computer-readable program. Thus, the present invention can be provided by hardware or software, or a hardware and software combination. A storage medium for storing a program can be an arbitrarily selected computer-readable medium, such as a hard disk, a CD-ROM, an optical storage device or a magnetic storage device.

A computer system used for this embodiment is a common computer system wherein a central processing unit (CPU), a main memory (RAM) and a nonvolatile memory (ROM) are interconnected by a bus. In addition, a co-processor, an image accelerator, a cache memory and an input/output controller (I/O) are connected to the bus, as are an external storage device, a data input device, a display device, a communication controller and a speech output device, all of which are connected via appropriate interfaces. Other hardware resources that are normally provided for a computer system are also included. An example storage device can be a hard disk drive, a magneto-optical storage device, an optical storage device or a semiconductor memory, such as a flash memory. An example data input device is an input device such as a keyboard, a pointing device such as a mouse, a pen input device, a tablet device, an image reader such as a scanner, or a speech input device. An example display device can be a CRT, a liquid crystal display device, or a plasma display device. The above described computer system includes various types of computers, such as personal computers, workstations and main frame computers.

The telephone used in this embodiment can be one selected from among the various types that are presently available, including fixed telephones, portable telephones, analog line telephones, digital line telephones compatible with ISDN, and telephones compatible with the Internet, such as L-mode telephones. The data input/output device may be a portable telephone, such as a PDA (Personal Digital Assistants), a digital portable telephone, Internet-compatible telephone, such as an i-mode telephone, or a PHS (Personal Handy-phone System) handset.

FIG. 1 is a block diagram illustrating an example information access system according to the embodiment of the present invention. The information access system for this embodiment comprises a telephone 1, a speech, Web access server 2, and a Web server 3. The telephone 1 can be one of the various types of telephones described above, including an Internet telephone. One function of the Web server 3 is the reception of HTTP (Hypertext Transfer Protocol) or HTTPS requests and the supply in return of a structural document, such as an HTML or XML document. Only one Web server 3 is shown in FIG. 1, but multiple Web servers may be employed. That is, when associated Web pages are recorded in a number of different Web servers, the Web pages may be downloaded by multiple Web servers.

The speech Web access server 2 includes a VoiceXML browser 4, a VoiceXML generation module 5 and a transcoding module 6. In this embodiment, VoiceXML is employed as a speech response system description language; however, the present invention is not thus limited, and any appropriate system description language can be employed to provide a speech response. It should be noted, however, that by using VoiceXML the system description can be simplified and that remarkable effects can be obtained when this invention is used.

One of the functions of the VoiceXML browser 4, an overview of which is given below, is the processing of structural documents (VoiceXML documents) written using VoiceXML, a speech recognition and output software language based on XML, for which, as for XML, elements in a document can be defined by using tags. Specifically, form elements are specified by "form" tags, and a process is performed for each form. In a form, a variable to be orally input can be designated by using a "field" tag, and a character prepared in accordance with the grammar defined by a "grammar" tag can be orally identified and input to a field variable. When a character is orally input to a field variable, a process designated by a "filled" tag is performed, while text data is designated by a "prompt" tag, and is orally output (read orally). In this manner, using these tags, the speech recognition and the speech output processes can be easily performed. It should naturally be noted that functions other than those described above are also included in VoiceXML, and that detailed functions for them are written as specifications available from (http://www.voicexml.org/spec.html).

The VoiceXML browser 4 includes a speech synthesis engine 7, a speech recognition engine 8 and a DTMF (Dual Tone Multi Frequency: a so-called dial tone) signal process engine 9. The speech synthesis engine 7 performs speech synthesis for text designated by a prompt tag in a form that is currently being processed (the text in the form when the prompt is removed), and outputs the obtained speech to the telephone 1. The speech recognition engine 8 recognizes the speech received by the telephone 1, and loads the recognized character into the field in the form that is currently being processed. It should be noted that the speech recognition process is performed in accordance with the above described grammar. Subsequently, the DTMF signal process engine 9 receives and processes a DTMF signal.

The VoiceXML generation module 5 converts an HTML or XML document into a form that is compatible with VoiceXML.

Figure 2:
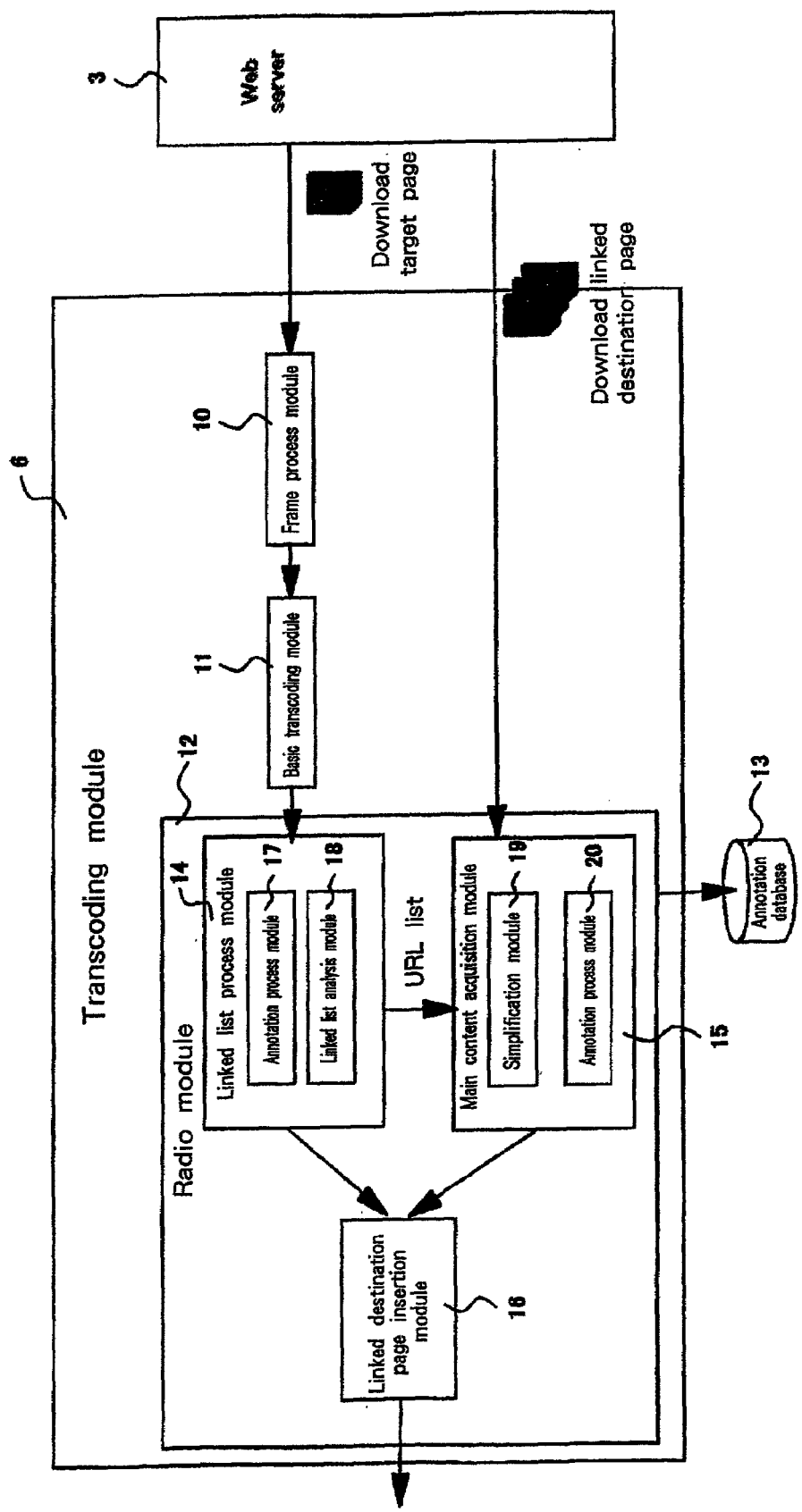
FIG. 2 is a detailed block diagram showing an example configuration of a transcoding module 6.

The transcoding module 6 converts an original Web page (written in HTML or XML), which is downloaded from the Web server 3, into a document form that matches a response conveyed by telephone. FIG. 2 is a detailed block diagram showing the configuration of the transcoding module 6, which includes a frame process module 10, a basic transcoding module 11 and a radio module 12. An annotation database 13 is also provided that the transcoding module 6 refers to.

When frames are included in an original Web page obtained from the Web server 3, the frame process module 10 detects the main frame, and develops the other frames in correlation with the main frame. Since multiple frames are developed, a page having a frame structure can be converted into a form that is appropriate for speech output.

The basic transcoding module 11 adds a "jump to main text" link, and also automatically adds an ALT attribute for image data if available.

The radio module 12 generates a Web page containing an appropriate amount of information, so that, as when listening to a radio, a user need not listen too closely to the content of the original Web page obtained from the Web server 3. The radio module 12 includes a linked list process module 14, a main content acquisition module 15 and a linked destination page insertion module 16.

The linked list process module 14 obtains a list of links included with a page after the basic transcoding has been performed. And when an annotation is added to the page, an annotation process module 17 performs a process by referring to the annotation. While preparations for the linked list are performed by a linked list analysis module 18.

The main content acquisition module 15 extracts the main content from a linked destination page that is extracted by the linked list process module 14. When an annotation is added to the linked destination page, an annotation process module 20 simplifies the page by referring to the annotation. This simplification is an operation performed to simplify a page to obtain a form that is appropriate for speech output. When, for example, a banner or an image is included on a page, data not required for speech synthesis are deleted or replaced with text data. And when an annotation is not added to the linked destination page, a Web simplification method (disclosed in Japanese Patent Application No. 2000-227996), an invention submitted by the present inventors, is used to perform the simplification process. A simplification module 19 manages the simplification process that is performed when there is no annotation.

It should be here noted that the annotation process modules 17 and 20 refer to the annotation database 13.

The linked destination page insertion module 16 inserts, into a target page (a page that includes the linked list for the linking source), the content of the linked destination page obtained by the main content acquisition module 15.

An explanation will now be given for the processing (a Web access effected using a telephone) performed by the telephone response system that employs the above described system. The oral information provision service provided by the current telephone response system has not yet become popular because only specific, limited information is available, and because even though only a simple interface is used when accessing information, i.e., a selection is made by choosing one of multiple choices, in total, the operation of the system is complicated. In contrast, the telephone Web access system that will be described below is effective because a wide range of information is provided.

(1) Basic Conversion

The process performed by the frame process module 10 and the basic transcoding module 11 corresponds to the basic conversion process. Conventional techniques, such as the addition of a "jump to the main text" link or an automatic addition of an ALT attribute, can be employed for the basic transcoding, and no detailed explanation for them will be given.

(1-1) Frame Process

This is a frame development process, performed by the frame process module 10, for removing a frame from a page for which frames are used. This process is not required for a page that does not employ frames.

(1-1-1) Detection of Main Frame

Since generally, not only an index frame and a banner frame, but also a frame for the main content are provided for a page, the main frame, including the main content, is presented to a user first. The following heuristics can be employed to specify the main content. As an example process, weighting is performed for the following two indexes to be defined as a main frame:

(i) the frame that is displayed in the largest area while assuming the display size of a standard personal computer; and (ii) the frame that includes the greatest amount of content (characters).

The above indexes may be employed independently.

When an error in the automatic detection occurs while using the index, the user can change the mode to the main frame markup mode so as to register, in a database, the annotation information that designates the main frame.

Thus, in the next process, the main frame is designated not by using automatic detection, but by using annotation information.

(1-1-2) Annotation-based Transcoding

Transcoding is performed on the annotation base for the page of the main frame. When annotations are used for the conventional techniques for rearranging content and for inserting a help message, the transcoding is performed based on these annotations.

First, the visual groups for a page are rearranged in accordance with their importance levels, based on the annotation information. Included in the annotation information is a data structure used to describe each group. Further, text representing delimiters used for the groups is inserted into the page, and a link to each group is inserted at the head of the page. The text information for these links can be used as the titles for the individual groups, and therefore, the user need only confirm these links to obtain an overview of the information presented on the page.

(1-1-3) Embedding of a Link in the Main Frame Page

The page for the main frame is obtained, and a link to another frame is embedded at the top of the page. This system employs the main frame for oral reading, and since the link to another frame page is embedded in the main frame, accessing if another frame is available. For example, when the link to a page to be read to another frame is embedded at the top of the page, the user can also access the other frame. And when a "jump to main text" link is present at the top of the page, the link to the other frame is embedded immediately following that link.

(1-1-4) Specific Example for Frame Processing

When a frame is read directly using the oral reading/navigation function of a homepage reader, the following state is obtained. Specifically, when a page written using a frame is to be accessed non-visually, each of the frames written to the basic frame page (hereinafter referred to as frame 0) is opened and its contents are confirmed. At this time, the information provided for the user is only the text written with a "name" attribute for a "frame" tag. For example, the following is the speech information orally read in the page of frame 0 at a specific Web site (www.tfm.cojp).

| | |
|---|---|
| ***** | |
| frame 1 | TFM on the Web |
| frame 2 | TFM on the Web |
| frame 3 | TFM on the Web |
| frame 4 | TEM on the Web |
| frame 5 | TFM on the Web |
| frame 6 | TFM on the Web |
| frame 7 | TFM on the Web |
| frame 8 | TFM on banner frame |
| frame 9 | TFM write frame |
| frame 10 | TFM on the Web |
| frame 11 | TFM banner frame |
| frame 12 | TFM on the Web |
| ******** | |

Only two frames have slightly different names (information designated by "name" attributes), and the user can not confirm or determine the contents of the frames unless they are opened. In this case, only frame 9 is required; all the other frames are for image data, which is information that is not required for non-visual Web access. According to this method, immediately after www.tfm.cojp is accessed, instead of the page for frame 0, frame 9 is opened first. That is, for the above example, frame 9 is selected when the determination of the main frame based on heuristics, while for the other frames, the "name" attribute is read orally following the frame numbers, as is done conventionally. Similarly, for navigation, the individual frames are selected and opened, so that the contents of the frames can be confirmed. Thus, the user can access the frame page in the same operation as the normal home page, without being aware of the frame page. Since presently many pages use frames, this method is especially effective for browsing Web information using the telephone response system.

(2) Radio Transcoding

The transcoding technique, for orally reading a Web page so that the speech produced resembles that provided by a radio,.is proposed as a transcoding technique for VoiceXML that would entice even users having normal eyesight. When a person having normal eyesight employs this system while working, it is assumed that, just as when listening to a radio, the user only half-attentively "listens to" the Web page broadcast. However, for oral reading that continues for a long time, since one Web page includes an extremely small amount of data, and since the title of the article and the content are widely separated from each other, it is difficult to obtain meaningful information without performing some navigation (as is also true when listening to a radio). Thus, according to the radio transcoding technique, one huge Web page is prepared by using several Web pages. This process corresponds to the process performed by the radio module 12. Radio transcoding is very effective when used for an article title linked list, which is frequently employed for the top pages of news company sites. The basic processing steps are as follows.

1. A user designates a group constituting a linked list, such as a linked list composed of the titles of news articles, to be orally read, sequentially.

2. The system extracts the main content from each linked destination page, and inserts the main content immediately following a link used to prepare a huge page. The inserted text can then be represented by sound effects.

3. At the time of the next access, the huge page is orally read, automatically.

Through this processing, even when a page is updated daily, the user can sequentially listen to desired information while working. The processing performed at the individual steps will now be described in detail.

(2-1) Designation of a Linked List

When a DTMF key sequence (e.g., *20) or a voice command ("define this as a radio", etc.) is input during the oral reading of a page, the system registers, in the annotation database 13, annotation information with which the linked list is to be changed to the radio mode.

Before the generation of a linked list, when a group annotation is provided for the rearrangement of the content of pages, a pertinent group is defined as a linked list area. But when no annotation information is available, an area for a continuous linked sequence consisting of short character strings or small images is registered as a linked list area.

It should be noted that a linked list may be designated as comprising units of pages, and in this case, linked destination content is inserted adjacent to a link for an entire page. Thus, this method is effective means for processing all content, including linked destination content.

(2-2) Extraction of the Main Content from a Linked Destination Page

The extraction of the main content from a linked destination page is performed in accordance with the following policy.

1. When a group annotation is available for the rearrangement of page content, the most the important information is extracted as the main content.

2. When no annotation information is available, the layout element is removed by differential calculation, which is the conventional technique (performed by employing the previously described simplification method), and in addition, the fragments of character strings are also removed. The resultant content is then defined as the main content.

The main content is specified based on this policy, and is inserted immediately following the link for the linked source page.

The link insertion position need not immediately follow the main content, and any linked location (a location for which the linked structure is not updated) can be employed.

When a link is present in the main content, and represents a reference to a pertinent page, or to a relative path, the link is rewritten to the URL (Uniform Resource Locator) of the linked source page (the page into which the content is inserted). Further, a link is deleted when the same character string as that for the link, such as the title of an article, is present at the top of a page into which the link is to be inserted. Thus, the overlapping of information can be eliminated.

(2-3) Case of the Next Access

Radio transcoding is automatically performed at the time of the next access. The radio transcoding area selected by the user can be registered as annotation information in the annotation database 13, and the annotation information can, for example, include the following data.

"username": designated user name

"xpath": Xpath attribute for a designated area

"generator": automatic detected area or a correct area based on an annotation

"resource": the URL of an annotation target page

When the associated information that is automatically obtained does not reflect the intent of a user, a tool for correcting the acquisition location can be provided as a Web application, and the information designated by the user can be stored in an additional information database.

(2-4) Specific Radio Transcoding Example

Figure 3:
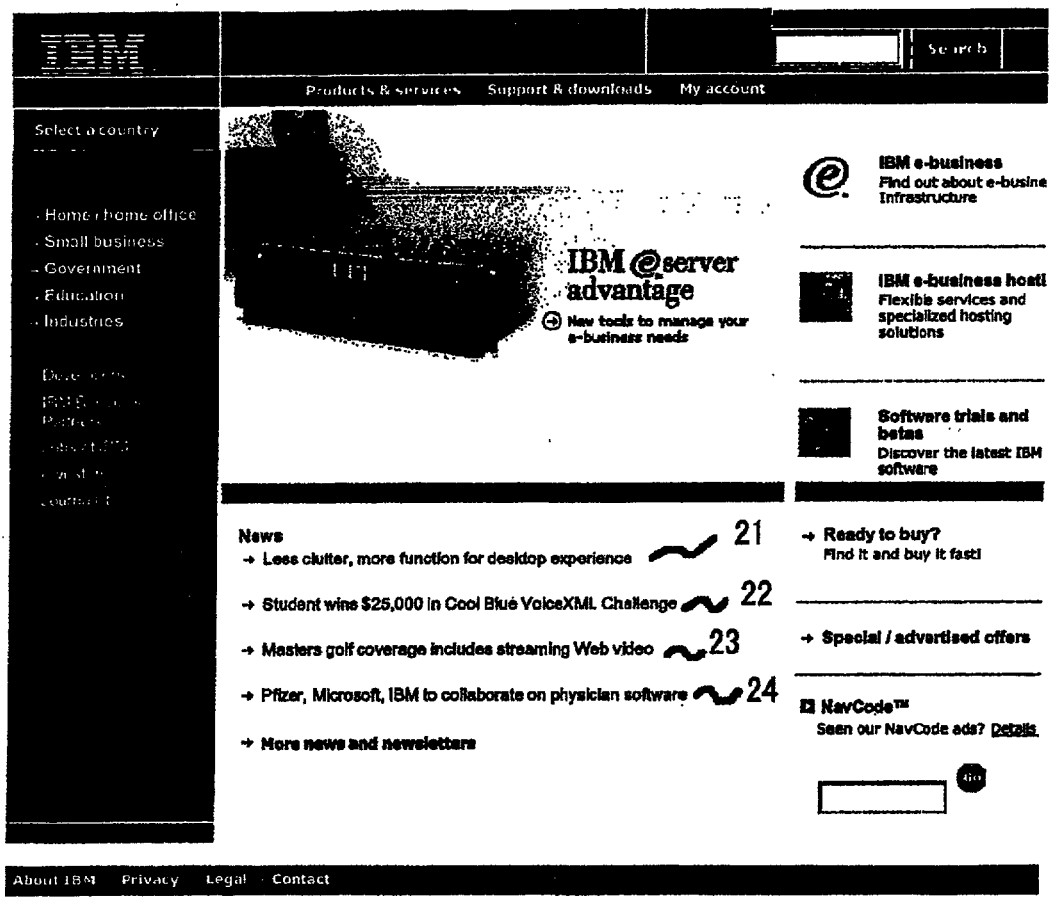
FIG. 3 is a diagram showing an example display screen for a target original Web page.
Figure 4:
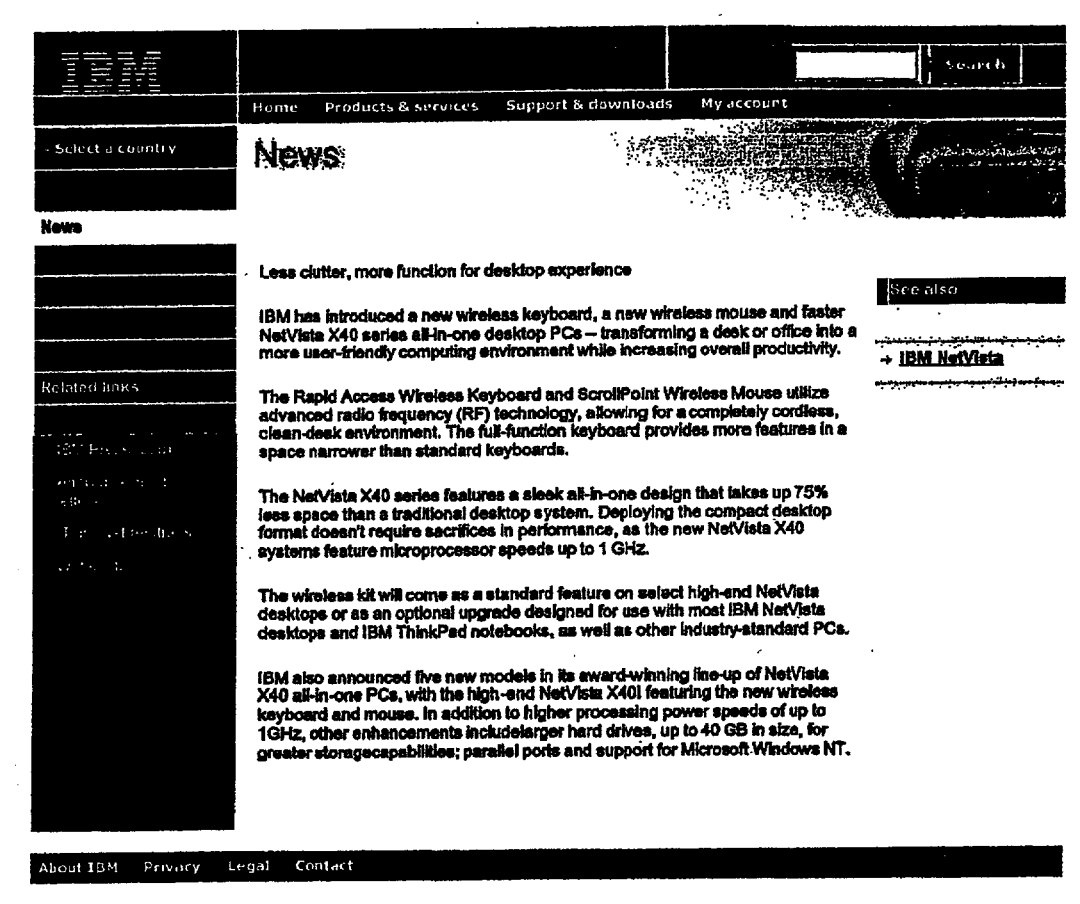
Figure 5:
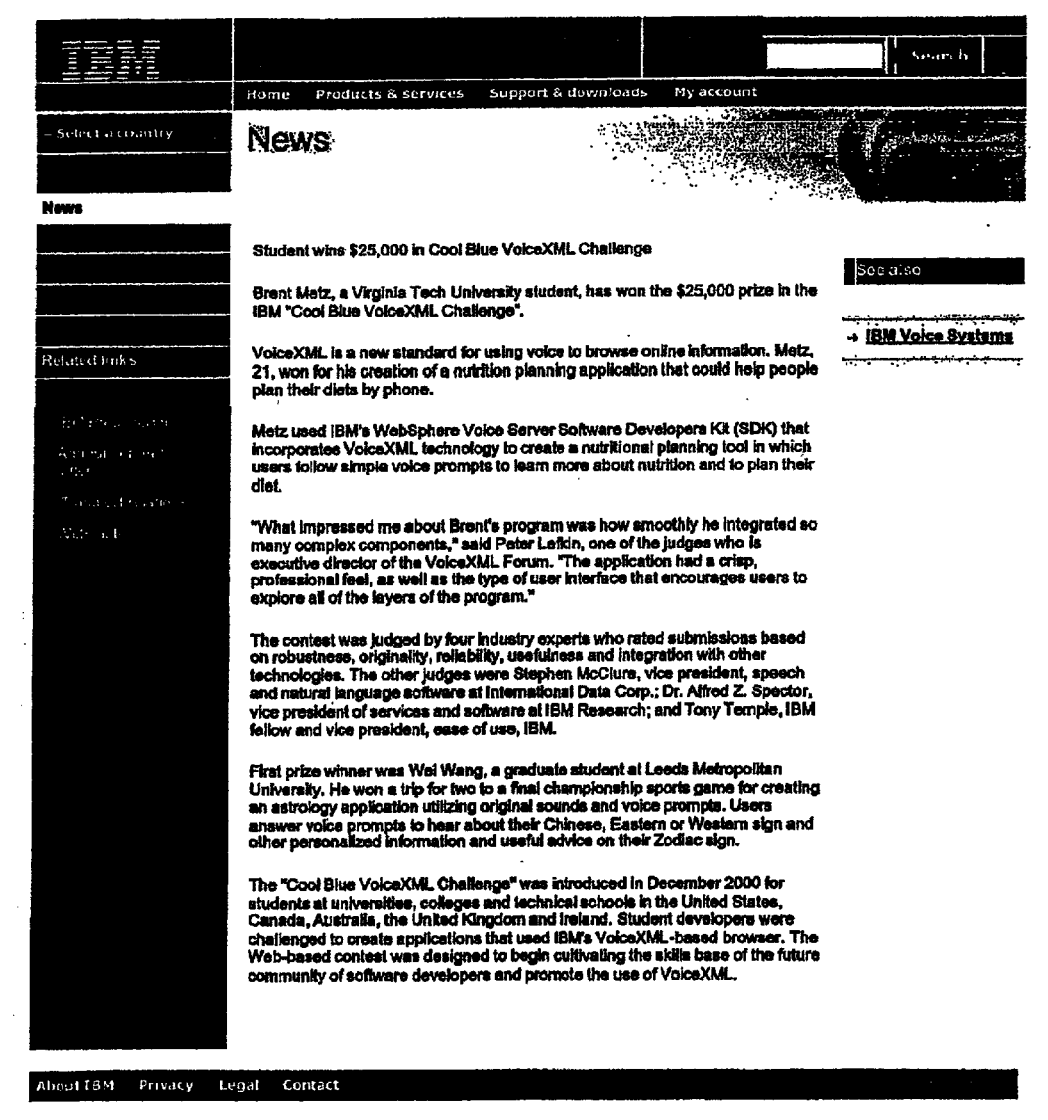
Figure 6:
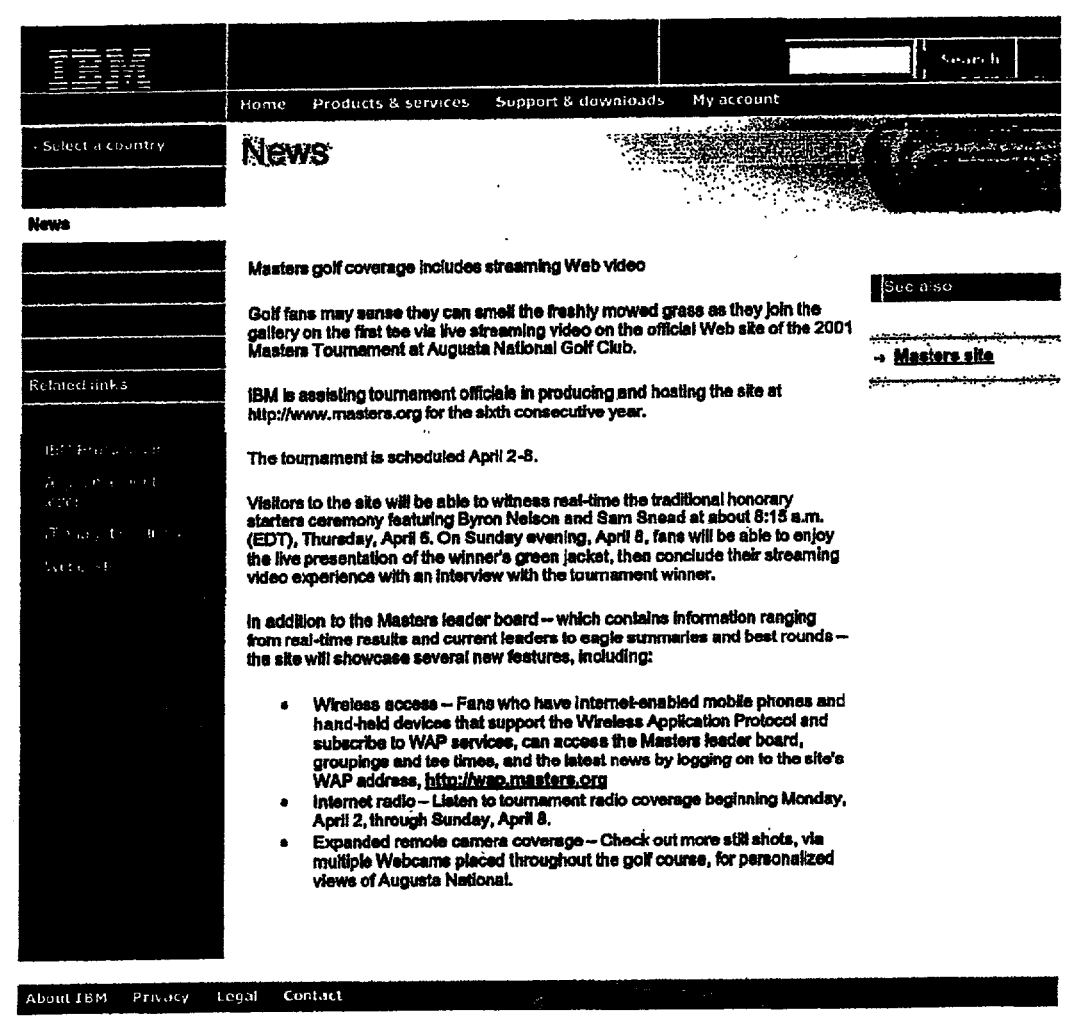
Figure 7:
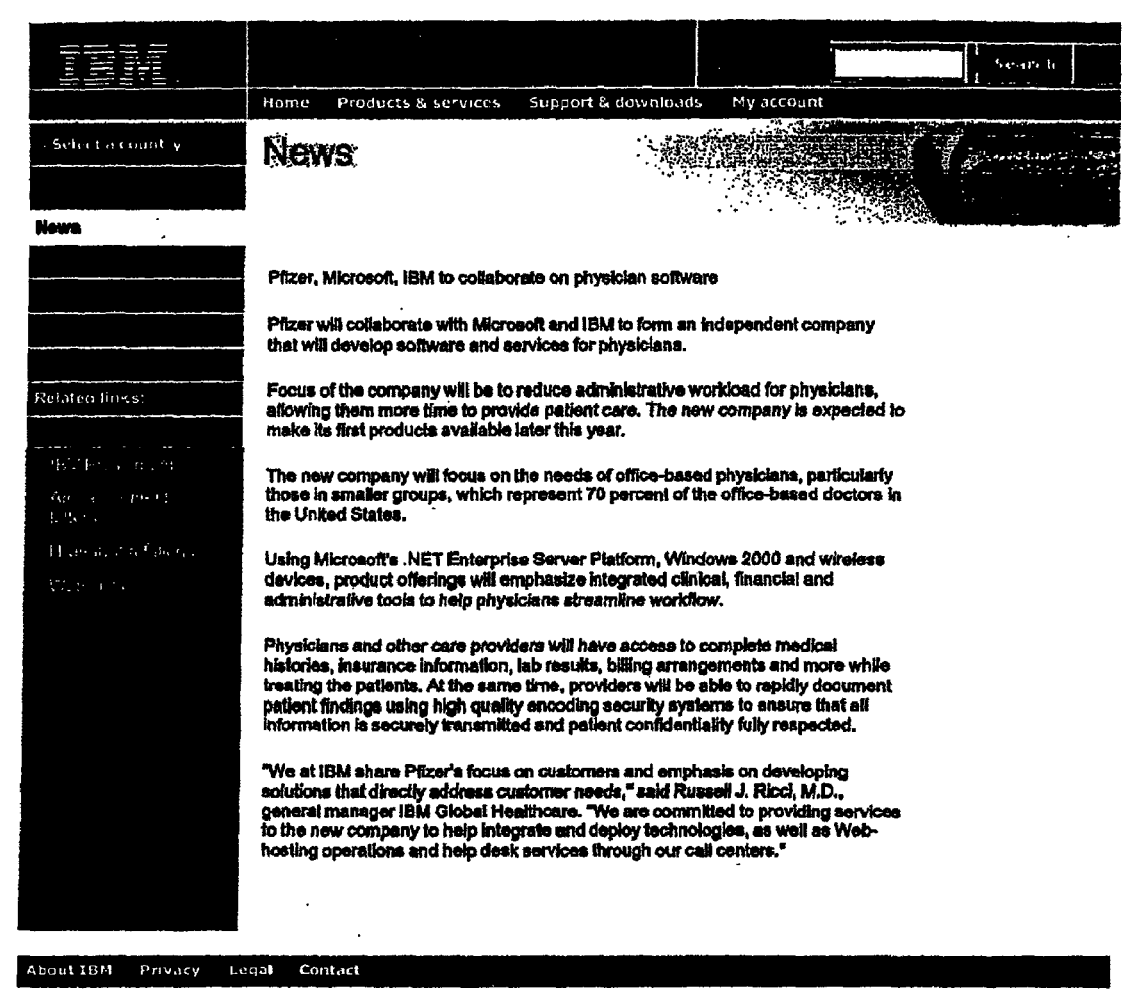
Figure 8:
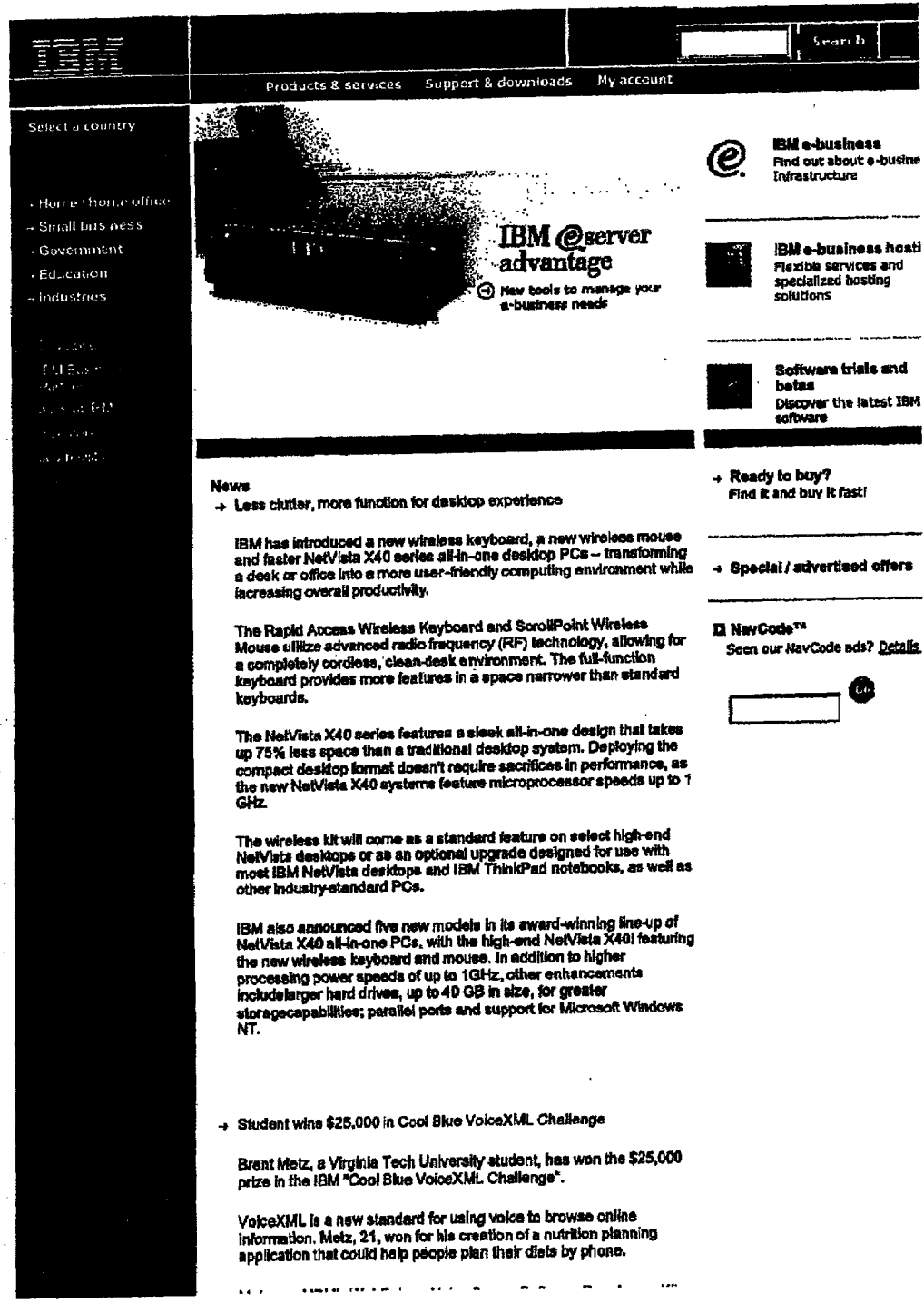
FIG. 8 is a diagram showing a display screen for (part of) a page obtained by radio transcoding.

FIG. 3 is a diagram showing an example display screen for an original target Web page. Assume that linked list lines 21 to 24 are designated. FIGS. 4 to 7 are diagrams showing display screens for linked destination pages corresponding to the linked list lines 21 to 24. The pages shown in FIGS. 8 to 10 are generated by the above described radio transcoding. It should be noted that since the screen is elongated, it is divided into three segments, which are shown in FIGS. 8 to 10, and originally only one page is shown. As is indicated, only the main content of a linked destination page is inserted into a target page, and only one large page is generated. Thus, an oral reading page is generated that is appropriate for listening, just as when a radio is used. On the screen, the linked list is displayed on the left and the banner is displayed in the upper portion; however, these elements can be removed when an annotation is provided for their elimination, or when the above descried simplification method is applied.

(3) Generation of VoiceXML

Then, the Web page content is automatically converted into a telephone response system description language (VoiceXML, etc.). This process is subject to the VoiceXML generation module 5. As a user interface for navigation, a navigation command is prepared that is similar to a command that is prepared by a speech browser for the personal computer of a visually impaired person. Thus, the functions of a speech browser, such as the oral reading of continuous information and the jumping from arbitrary information location to arbitrary information location on a page, can be carried out by VoiceXML. The following policy is employed for the conversion for which VoiceXML is employed.

1. Each element on a Web page is allocated for one Voice XML form. While, normally, the form is used to process the prompt for the system and the user's input, oral reading of one element is performed using the form.

2. The time out for each form is set to 0. A form that corresponds to the next element in a page is set as a destination form following the time out. Therefore, each element can be continuously read orally as time elapses.

3. The same key operation and the same key speech operation grammar are set for all the forms, and an interrupt is also permitted for all the forms. Therefore, at any point during the oral reading, the same operation can be performed without any separation between the forms being acknowledged.

The key operation for the telephone is allocated as is shown in FIG. 11 in order that the telephone can act as a speech browser. FIG. 11 is a diagram showing an example wherein commands are allocated for telephone keys. While the common speech browser employs a keyboard and numerical keys, only twelve telephone keys, including "*" and "#", can be employed. Therefore, the basic functions are allocated by carefully selecting required functions and employing "*" as a modifier key. It should be noted that the same functions can be accessed using speech commands. FIG. 12 is a diagram showing example commands that can be used.

Further, information that can not be represented by the speech synthesis used for the text on a page, e.g., the current position, the font style, the background and foreground colors and the logical structure of a page, are represented by sound effects. Example sound effects will now be specifically described.

1. For the positioning during oral reading, positions calculated as a ratio (%) of the information available on a page that are orally read are represented by changing the parameters used for speech synthesis. Since the number of parameter change steps a human being can identify is limited, parameters for the positional information are allocated step by step. For example, when the number of parameter steps that a person can identify is 5, for each 20% of the available information the same parameter is allocated. In this instance, the speech synthesis parameters can be various recognizable sounds, such as the pitch of a tone, the oral reading speed, the timbre (voice quality), the tempo of a background tone, and the genre of music.

2. When a command for shifting among elements/links/groups is selected, the direction of travel is also represented by a sound. The sound having ascending intervals is employed when moving up, and a sound having descending intervals is employed when moving down. Further, changes in the intervals can be controlled by the amount of text that is skipped and is not read orally.

3. The character attribute that is most frequently employed in the text is analyzed, and a default speech parameter is allocated for text having that attribute, while different speech parameters are allocated for text having the other text attributes. Since there is a limit to the parameter changes that a person can recognize, differences in the character attributes can not be represented in detail; however, it is easy to identify the different font sizes, styles and colors that are used.

4. In the same manner as the structure of a visual page is intuitively understood, an overview of a page can be represented merely by using sound effects. Different sounds are allocated for the page structure elements, such as character attributes, styles, font sizes, colors, linked text and form starts/ends, and are sequentially reproduced. The length of each sound produced is proportional to the length of the text, and only specific information designated by a user can be sequentially reproduced. As one example method, when only one specific link and all others are represented, only the occupation ratio of the linked list can be intuitively understood. Further, when the start/end of the table and the start of a cell are represented, a function can be provided whereby the regularity of the table structure can be intuitively confirmed, and the layout table can be identified from the table used to represent the data.

The present invention has been specifically explained during the course of the explanation given for the embodiment. However, the present invention is not limited to this embodiment, and can be variously modified without departing from the scope of the invention.

For example, while in the embodiment a telephone is used to access the Web, rather than using a telephone, a browser plug-in can be employed. And instead of a telephone, the present invention can also be applied for a combination consisting of browser incorporated plug-in and streaming audio reproduction software (e.g., RealAudio). FIG. 13 is a block diagram showing the system configuration for which the combination consisting of the browser plug-in and the streaming audio reproduction software is employed. For an access for which a plug-in 35 of a browser 34 is used, the key input information is transmitted by the plug-in 35 using socket communication. In a plug-in server 31, a key operation reception module 33 receives the key input information, and transmits it to a VoiceXML browser 4. And a speech signal from the VoiceXML browser 4 is converted into streaming data by a streaming conversion module 32, and is transmitted to the browser 34. In this instance, the browser 34 does not need a speech synthesis apparatus, and need only have a function for reproducing streaming data. With this system, a visually impaired person can access the Web without having to install complicated software on his or her personal computer. And furthermore, even when a device, such as a portable terminal, is used, wherein a speech synthesis engine can not be mounted, an impaired person can access the Web using speech.

Also, the radio transcoding is not limited in use to preparing speech output, and can also regarded as a technique for converting multiple pages into a single page. Therefore, when visually it is easier to collect divided pages and to prepare a single page, this technique can be used not only for Web speech access, but also for the preparation of a visual display. As an example, the radio transcoding can be applied for a case wherein it is better for chapters or pages constituting sections of a paper to be assembled and handled as a single page, so as to facilitate the printing or the browsing of the material.

In addition, the basic or the radio transcoding techniques can be used together with a display on a display screen. For example, to access the Web using a device having a small screen, such as a portable terminal, the usability can be enhanced if the Web can be accessed while oral reading and a visual display are presented at the same time. This invention can be applied in this case by first performing the basic transcoding or, as needed, the radio transcoding, and then transmitting both VoiceXML and HTML documents to a client. On the client side, a plug-in that reproduces VoiceXML and HTML text synchronously, i.e., that scrolls the HTML display in unison with the oral reading is operated by the browser, so that visual and aural Web access is available in an environment provided by a device having a small-screen. Further, as the HTML view is scrolled, not only can the overview of the sounds be understood, but also only the sounds can be released without the text being read orally, so that a target location can be quickly reached while the overview of the document structure is aurally confirmed.

While it is preferable that speech and image be synchronized, this synchronization is not always required.

In this embodiment, the content of a linked destination page has been inserted into a target page; however, only the information indicating the amount of data on the linked destination page may be inserted into the target page, and the content may be obtained from the linked destination page each time it is required. That is, instead of preparing a large page file, the minimum amount of information, such as a link, may be stored in a target page, and as the execution of the process is continued, the content of the linked destination page may be obtained from a predetermined URL.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. An information access method, said method comprising the steps of:
    designating a link or a linked list in a web page;
    obtaining a linked destination page designated in said link or in said linked list;
    inserting all or a part of the content of said linked destination page into a linked location at said web page; and
    outputting speech for all or a part of said content of said linked destination page inserted into said linked location at said web page.

2. The information access method according to claim 1, wherein one part of said linked destination page that is inserted into said linked location at said web page is the main content of said linked destination page.

3. The information access method according to claim 2, wherein said main content of said linked destination page is extracted using a first method for referring to annotation information or using a second method for extracting a difference from a page that is similar to said linked destination page.

4. The information access method according to claim 1, wherein a process for the insertion of said linked destination page is recorded as annotation information, and by referring to said annotation information the following process is automatically performed.

5. The information access method according to claim 1, said method further comprising a step of:
    converting, into a VoiceXML document, said web page into which part or all of said linked destination page has been inserted.

6. The information access method according to claim 5, wherein, for the conversion into the VoiceXML document, each element of a web page is allocated to the VoiceXML form, and is read orally in consonance with prompts included in the form.

7. The information access method according to claim 6, wherein the time-out for the form is set to 0, and wherein the elements are orally read sequentially while the processing for said form is performed in order.

8. The information access method according to claim 6, wherein, when the same grammars for a key input operation and a speech operation are set for said form, and an interrupt is permitted, a command is accepted during the processing performed for said form.

9. The information access method according to claim 7, wherein the destination for the output of a speech is a telephone, and through said telephone, a command is input using speech or a dial tone.

10. The information access method according to claim 1, wherein, for speech output, sound effects are added that reflect the structure, the volume, and the current processing location of the Web page content, and other associated information.

11. The information access method according to claim 1, wherein, along with the speech the screen of said web page is displayed on a display device.

12. The information access method according to claim 1, said method further comprising the steps of:
    detecting the main frame for said web page;
    generating a link correlated with a frame other than said main frame; and
    adding said link to said main frame.

13. The information access method according to claim 12, wherein said main frame is detected as a first element, a frame that is to be displayed in the largest area, a second element, a frame in which the greatest number of characters are included, or a third element, a frame having the greatest index that is used to weight said first and said second elements, or a combination of the elements.

14. The information access method according to claim 13, said method further comprising the step of:
    rearranging groups in said main frame in accordance with annotation when said annotation is added to said main frame, and inserting text or a link into said main frame or performing another operation.

15. An information access system comprising:
    a designator for designating a link or a linked list in a web page;
    an obtainer for obtaining a linked destination page designated in said link or in said linked list;
    an inserter for inserting all or a part of the content of said linked destination page into a linked location at said web page; and
    an outputter for outputting speech for all or a part of said content of said linked destination page inserted into said linked location at said web page.

16. The information access system according to claim 15, wherein one part of said linked destination page that is inserted into said linked location at said web page is the main content of said linked destination page.

17. The information access system according to claim 15, said method further comprising:
    a recorder for recording, as said annotation information, a process for the insertion of said linked destination page; and
    a performer for automatically performing the following process by referring to said annotation information.

18. The information access system according to claim 15, further comprising:

a converter for converting, into a VoiceXML document, said web page into which part or all of said linked destination page has been inserted.

19. The information access system according to claim 15, wherein the destination for the output of a speech is a telephone, and through said telephone, further comprising:
an acceptor for accepting input using speech or a dial tone.

20. The information access system according to claim 15, wherein said speech output means includes means for adding sound effects that reflect the structure, the volume, and the current processing location of the Web page content, and other associated information.

21. The information access system according to claim 15, further comprising:
a displayer for, along with the speech, displaying the screen of said web page is displayed on a display device.

22. The information access system according to claim 15, further comprising:
a detector for detecting the main frame for said web page;
a generator for generating a link correlated with a frame other than said main frame; and
an adder for adding said link to said main frame.

23. The information access system according to claim 22, wherein said main frame is detected as a first element, a frame that is to be displayed in the largest area, a second element, a frame in which the greatest number of characters are included, or a third element, a frame having the greatest index that is used to weight said first and said second elements, or a combination of the elements.

24. The information access system according to claim 23, further comprising:
a rearranger for rearranging groups in said main frame in accordance with annotation when said annotation is added to said main frame, and inserting text or a link into said main frame or performing another operation.

25. A program storage device readable by computer, tangibly embodying a program of instructions executable by the computer to perform method steps for facilitating data clustering, said method comprising the steps of:
designating a link or a linked list in a web page;
obtaining a linked destination page designated in said link or in said linked list;
inserting all or a part of the content of said linked destination page into a linked location at said web page; and
outputting speech for all or a part of said content of said linked destination page inserted into said linked location at said web page.

* * * * *

UNITED STATES PATENT AND TRADEMARK OFFICE
CERTIFICATE OF CORRECTION

PATENT NO. : 7,197,462 B2 Page 1 of 1
APPLICATION NO. : 10/133686
DATED : March 17, 2007
INVENTOR(S) : Takagi et al.

It is certified that error appears in the above-identified patent and that said Letters Patent is hereby corrected as shown below:

In the patent                                         In the file history

Column 16, Line 12, "computer"
should be   --machine--                               Per Amendment, Page 8

Column 16, Line 14, "computer"
should be   --machine--                               Per Amendment, Page 8

Signed and Sealed this

Fifth Day of February, 2008

JON W. DUDAS
*Director of the United States Patent and Trademark Office*